(12) United States Patent
Watanabe et al.

(10) Patent No.: US 9,821,864 B2
(45) Date of Patent: Nov. 21, 2017

(54) VEHICLE AERODYNAMIC STRUCTURE

(71) Applicant: FUJI JUKOGYO KABUSHIKI KAISHA, Tokyo (JP)

(72) Inventors: Naoto Watanabe, Tokyo (JP); Shintaro Hanawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/076,988

(22) Filed: Mar. 22, 2016

(65) Prior Publication Data

US 2016/0280289 A1    Sep. 29, 2016

(30) Foreign Application Priority Data

Mar. 27, 2015 (JP) ................................. 2015-067337

(51) Int. Cl.
*B62D 35/02* (2006.01)

(52) U.S. Cl.
CPC ............... *B62D 35/02* (2013.01); *Y02T 10/88* (2013.01)

(58) Field of Classification Search
CPC ...... B62D 25/16; B62D 35/004; B62D 25/18; B62D 25/20; B62D 29/043; B62D 25/02; B60J 7/223; B60J 5/101; B60J 11/02; B60J 1/2088; B60J 5/0415; B60J 7/026; B60J 7/041
USPC .......... 296/180.1, 180.4, 187.09, 100.03, 76, 296/39.2; 301/104, 37.41; 29/408, 428, 29/446, 894, 3
See application file for complete search history.

(56) References Cited

U.S. PATENT DOCUMENTS

| | | | | |
|---|---|---|---|---|
| 5,908,217 A | * | 6/1999 | Englar | B62D 35/00 296/180.1 |
| 6,068,328 A | * | 5/2000 | Gazdzinski | B62D 35/00 244/203 |
| 8,870,275 B1 | * | 10/2014 | Schmidt | B62D 35/001 244/209 |
| 8,882,176 B2 | * | 11/2014 | Froling | B62D 35/02 296/180.1 |
| 2009/0085371 A1 | | 4/2009 | Nagahama | |

(Continued)

FOREIGN PATENT DOCUMENTS

| | | |
|---|---|---|
| CN | 101160234 A | 4/2008 |
| FR | 2 863 244 | 6/2005 |
| FR | 2863244 A1 | 6/2005 |

(Continued)

OTHER PUBLICATIONS

Japanese Office Action dated Aug. 30, 2016 in Japanese Patent Application No. 2015-067337 (5 pages including machine translation).

(Continued)

*Primary Examiner* — Glenn Dayoan
*Assistant Examiner* — Sunsurraye Westbrook
(74) *Attorney, Agent, or Firm* — Smith, Gambrell & Russell, LLP

(57) ABSTRACT

A vehicle aerodynamic structure changes an airflow passing under a vehicle floor. The structure includes at least one aerodynamic add-on device that exerts an impact on the airflow passing under a lower surface of the vehicle floor. The device is disposed below the lower surface of the vehicle floor on the inboard side of an inboard surface of a tire so as to be located behind a front end of the tire or a flap.

20 Claims, 7 Drawing Sheets

(56) References Cited

U.S. PATENT DOCUMENTS

| 2013/0093209 A1* | 4/2013 | Johnson | B62D 35/005 |
| | | | 296/180.1 |
| 2014/0175830 A1* | 6/2014 | Hasegawa | B62D 25/16 |
| | | | 296/180.1 |

FOREIGN PATENT DOCUMENTS

| JP | 11-005567 | 1/1999 |
| JP | H11-005567 | 1/1999 |
| JP | 2001-138753 | 5/2001 |
| JP | 2008-247146 | 10/2008 |
| JP | 2010-254023 | 11/2010 |
| JP | 2012-056499 | 3/2012 |

OTHER PUBLICATIONS

Japanese Office Action dated Nov. 8, 2016 relative to Japanese patent application No. 2015-067337 (4 pages including machine translation).

Chinese Office Action dated Jun. 7, 2017 relative to Chinese Patent Application No. 201610173570.X (10 pages including machine translation).

* cited by examiner

VEHICLE AERODYNAMIC STRUCTURE

CROSS-REFERENCE TO RELATED APPLICATIONS

The present application claoms priority from Japanese Patent Application No. 2015-067337 filed on Mar. 27, 2015, the entire contents of which are hereby incorpirated by reference.

BACKGROUND

1. Technical Field

The present invention relates to vehicle aerodynamic structures and, more particularly, to a vehicle aerodynamic structure that accelerates an airflow passing under a floor of a vehicle that is traveling.

2. Related Art

When an automobile or other vehicle is running, an airflow passing under the floor of the vehicle is exposed to turbulence in a space between an inboard side of a tire and a vertical wall of a mud guard. Such turbulence causes an underfloor pressure in such a space to rise higher than that in a side sill, resulting in an airflow going to the outside of the vehicle. Such an airflow going to the outside of the vehicle turns to running resistance, causing such problems as worsened fuel economy and degraded running stability.

The following Japanese Unexamined Patent Application Publications (JP-A) describe an aerodynamic member disposed in the vicinity of a front tire to solve the problems described above.

JP-A. No. 2008-47146 discloses dimples formed on a vehicle fender to reduce air resistance inside the wheel house. As illustrated in FIG. 8, a plurality of dimples 102 are formed on the surface of an inner fender 100. With this arrangement, when the velocity of an airflow inside the wheel house reaches a predetermined level as a result of an increase in vehicle speed, the dimples 102 formed on the inner fender 100 change a laminar flow to a turbulent flow on a boundary layer close to the surface of the inner fender 100. As a result, the boundary layer's separation position is shifted downstream and leads to an increase in pressure in a low-pressure separation region that causes air resistance, thereby reducing etc resistance.

JP-A No. 2012-56499 discloses a vehicle flow straightening device for reducing an effect on a stream of air. Specifically, located in front of a tire 202, the vehicle flow straightening device 200 includes a flap 204 having a front face extending substantially laterally and vertically and a projection 206 that projects forward from the front face of the flap 204, as illustrated in FIG. 9. When a vehicle is running, the front face of the flap 204 changes the direction of an airflow passing along a surface to a direction in which contact of the airflow with a front tire and a lower arm that are disposed at the rear is avoided.

SUMMARY OF THE INVENTION

However, the devices described in the above patent documents are unlikely to reduce the levels of the air resistance resulting from an airflow passing under the vehicle floor.

Specifically, the dimples 102 disclosed in JP-A No. 2008-247146 are formed behind the tire, making it difficult to solve a problem caused by a turbulent airflow occurring on the inboard side of the tire.

In addition, the device disclosed in JP-A No. 2012-56499 has the flap 204 as an aerodynamic member formed in front of the front tire. This also makes it difficult to solve a problem caused by a turbulent airflow occurring on the inboard side of the tire.

It is desirable to provide a vehicle aerodynamic structure that reduces air resistance by accelerating an underfloor airflow on the inboard side of a tire.

An aspect of the present invention provides a vehicle aerodynamic structure that changes an airflow passing under a vehicle floor, including at least one aerodynamic add-on device that is disposed below a lower surface of the vehicle floor on the inboard side of an inboard surface of a tire so as to be located behind a front end of the tire or a flap, and that exerts an impact on the airflow passing under the lower surface of the vehicle floor.

The at least one aerodynamic add-on device may be a vortex generator.

The at least one aerodynamic add-on device may have a jet structure.

The at least one aerodynamic add-on device may be formed on a side wall, facing the tire, of a mud guard extending below the lower surface of the vehicle floor.

The at least one aerodynamic add-on device may be formed on a vehicle component disposed between a vertical wall of a wheel house and the tire.

The aerodynamic add-on device may be formed on each of an upper surface and a lower surface of the vehicle component.

BRIEF DESCRIPTION OF THE DRAWINGS

FIG. 1A is a side view of a vehicle, FIG. 1B is a cross-sectional view illustrating a vicinity of a tire, and FIG. 1C is a side view illustrating a front section of a vehicle;

FIG. 2A is side view of a vortex generator, and FIG. 2B is a cross-sectional view of that portion;

DETAILED DESCRIPTION

A vehicle aerodynamic structure according to examples of the present invention will be described below with reference to the attached drawings.

Figure 1A:
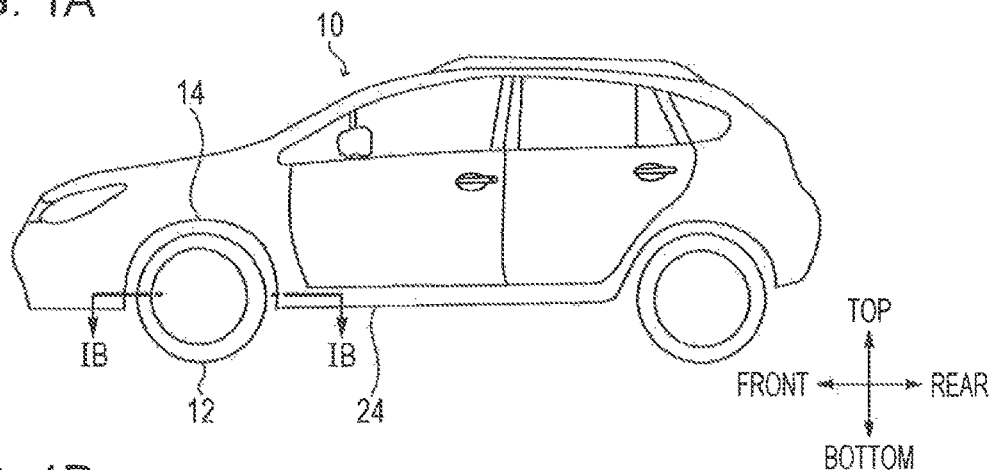
FIGS. 1A, 1B, and 1C are diagrams illustrating a vehicle aerodynamic structure according to a example of the present invention.
Figure 1B:
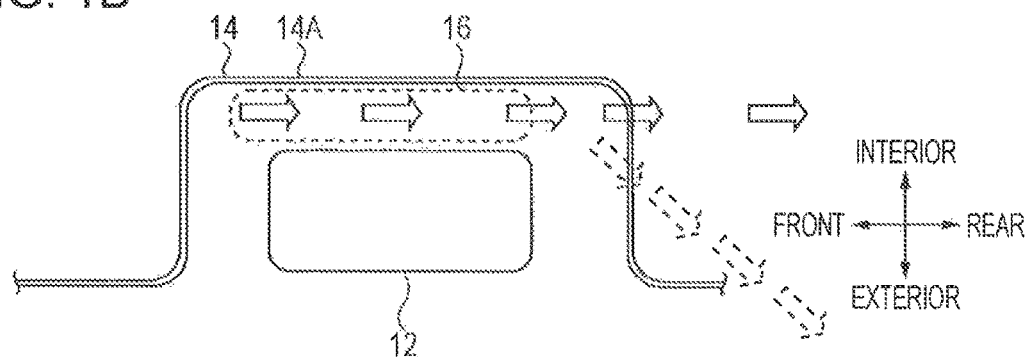
Figure 1C:
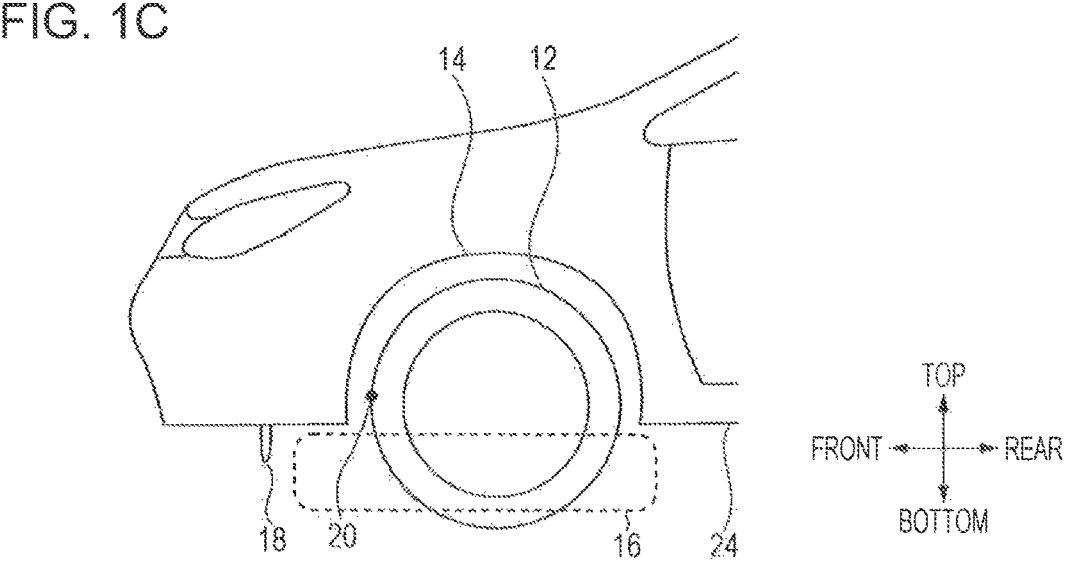

A vehicle employing the vehicle aerodynamic structure according to a first example is described below with reference to FIGS. 1A, 1B, and 1C. FIG. 1A is a side view of a vehicle 10. FIG. 1B is a cross-sectional view illustrating a vicinity of a tire. FIG. 1C is a side view illustrating a front section of a vehicle.

As illustrated in FIG. 1A, the vehicle 10 according to this example has an aerodynamic add-on device (not illustrated) formed on the inboard side of a tire 12 provided in a front section thereof. In this example, the vehicle 12 also has such an aerodynamic add-on device formed below a lower surface 24 of a vehicle floor. In this example, the disposition of the aerodynamic add-on device results in the airflow under the lower surface 24 of the vehicle floor accelerating rearward. Consequently, part of the airflow under a vehicle floor is prevented from going. from the inboard side of the tire 12 to the outside of vehicle body.

As illustrated in FIG. 1B the aerodynamic add-on device according to this example is formed in a region 16 defined by the inboard surface of the tire 12 and a vertical wall 14A of a wheel house 14. The aerodynamic add-on device disposed in such a region causes the airflow in the region 16 to accelerate. As a result, most of the airflow passing through the region 16 is directed rearward linearly without changing its direction. This airflow is indicated by solid-line arrows in the figure. As described in the related art, the airflow (indicated by dotted-line arrows) is prevented from going toward the outside of the vehicle 10, providing such benefits as reduced running resistance, enhanced fuel economy, and improved high-speed stability.

As illustrated in FIG. 1C, the aerodynamic add-on device according to this example is formed below the lower surface 24 of the vehicle floor at the rear of a front end 20 of the tire 12 or a flap 18. In other words, if such a flap 18 is formed in front of the tire 12, the aerodynamic add-on device according to this example is located at the rear of the flap 18. On the contrary if no such a flap 18 is formed, the aerodynamic add-on device is formed at the rear of the front end 20 of the tire 12. In a region lying at the rear of the front end 20 of the tire 12 or the flap 18, these components cause turbulence in the airflow running below the lower surface 24 of the vehicle floor, but the disposition of the aerodynamic add-on device according to this example in the region prevents the airflow from going to the outside of the vehicle 10.

Figure 2A:
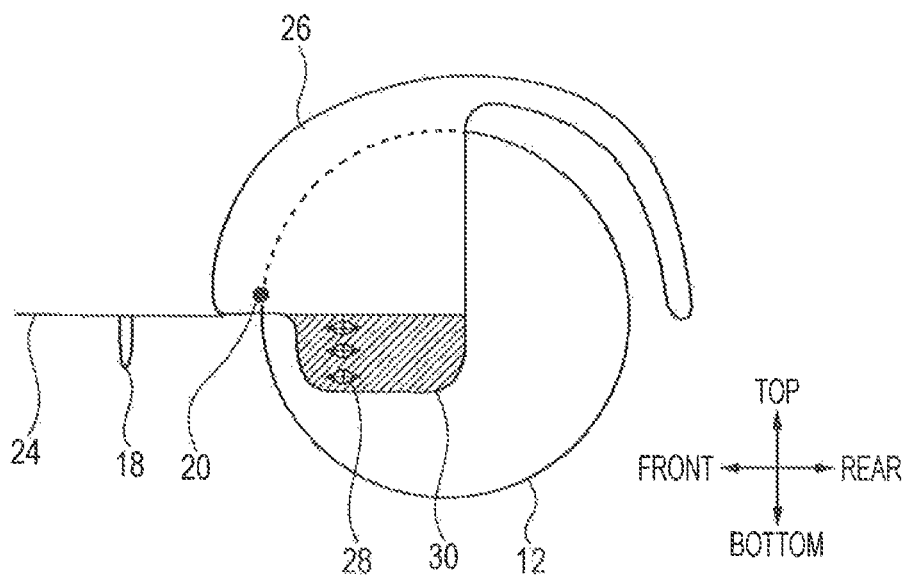
FIGS. 2A and 2B are diagrams illustrating a vehicle aerodynamic structure according to the example.
Figure 2B:
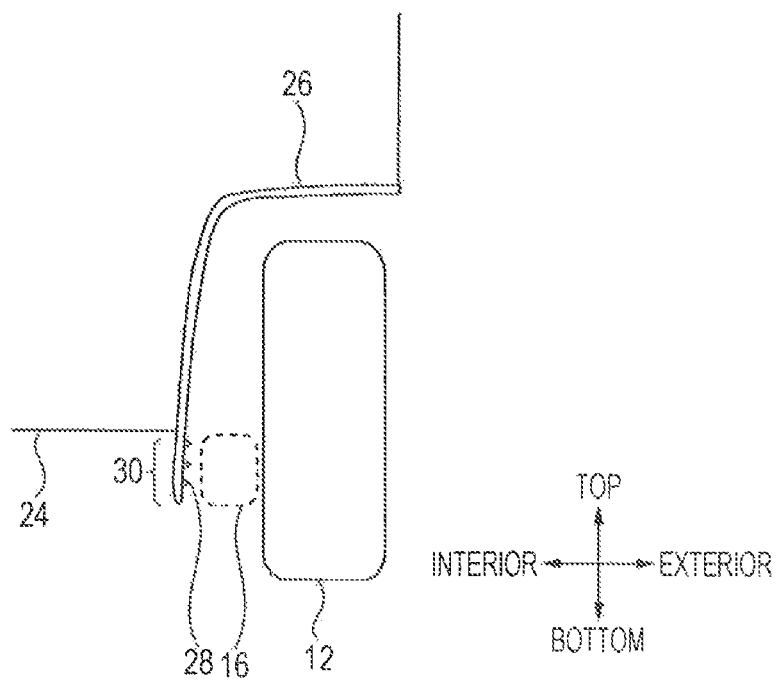

The aerodynamic add-on device described above will be specifically described below with reference to FIGS. 1A and 2B. FIG. 2A is a side view of a mud guard 26. FIG. 2B is a cross-sectional view.

As illustrated in FIG. 2A, the mud guard 26 is a component that is disposed inside the wheel house so as to surround an upper part of the tire 12. In this example the mud guard 26 has a hanging portion 30 extending downward from a vertical wall thereof, while the hanging portion 30 has a vortex generator 28 as an aerodynamic add-on device.

As illustrated in FIGS. 2A and 2B, the hanging portion 30 extends below the lower surface 24 of the vehicle floor. The vortex generator 28 is formed by partially projecting an inner wall of the hanging portion 30 toward the side of the tire 12. As illustrated in FIG. 2A, the vortex generator 28 is located at the rear of the front end 20 of the tire 12 or the flap 18.

In this example, the vortex generator 28 is formed in a plurality along the longitudinal direction of the vehicle 12. Specifically, the vortex generator 28, when viewed from a vehicle side, is formed in the she of, for instance, a diamond with a projection in the center thereof. The vortex generator 28 may be formed an other shapes and may include, for instance, a cylindrically-shaped projection or another component that is shrinkable in the thickness direction.

During vehicle operation, the vortex generator 28 is able to prevent the airflow below the lower surface 24 of the vehicle floor from going to the outside of the vehicle. Specifically, when an airflow occurs in the region 16 between the inboard surface of the tire 12 and the vertical wall of the mud guard 26 during vehicle operation, the airflow around the hanging portion 30 is disturbed by the vortex generator 28, causing the airflow to break away from the side face of the hanging portion 30. In addition, air that hits the front face of the tire 12 and then enters the region 16 is also disturbed by the vortex generator 28.

As a result, the airflow passing through the region 16 is accelerated, causing most of the airflow passing through the region 16 to more quickly flow toward the vehicle rear end. At this time, pressure in the region 16 and its vicinity is prevented from rising higher than that in the vehicle side. Consequently, the airflow passing below the vehicle floor is prevented from going sideways to the outside of the vehicle, whereby such benefits as reduced running resistance are provided.

Figure 3:
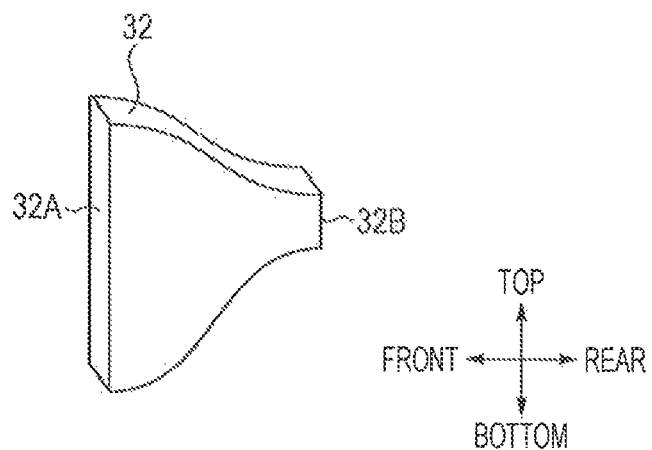
FIG. 3 is a diagram illustrating a vehicle aerodynamic structure according to a modification of the example, which includes a perspective view of a jet structure as an aerodynamic add-on device.

As illustrated in FIG. 3, a jet structure 32 may be used as an aerodynamic add-on device according to this example. The jet structure 32 is formed in an integrated manner on a side facing the tire 12 of the hanging portion 30 illustrated in FIG. 2A. The jet structure 32 has a front opening 32A that is open forward and a rear opening 32B that is open rearward. The rear opening 32B has a smaller opening area than the front opening 32A. As a result, during vehicle operation, air entering the let structure 32 through the front opening 32A is accelerated and ejected through the rear opening 32B toward the vehicle rear end. With this arrangement, the airflow in the region 16 illustrated in FIG. 2B is accelerated toward the vehicle rear end, thereby providing the same benefits as the vortex generator 28.

Although the rear opening 32B as for instance, a smaller opening area than the front opening 32A in this example, a constricted portion having a smaller opening area than the front opening 32A may be provided between the front opening 32A and the rear opening 32B, regardless of the opening area of the front opening 32A and the rear opening 32B.

Figure 4:
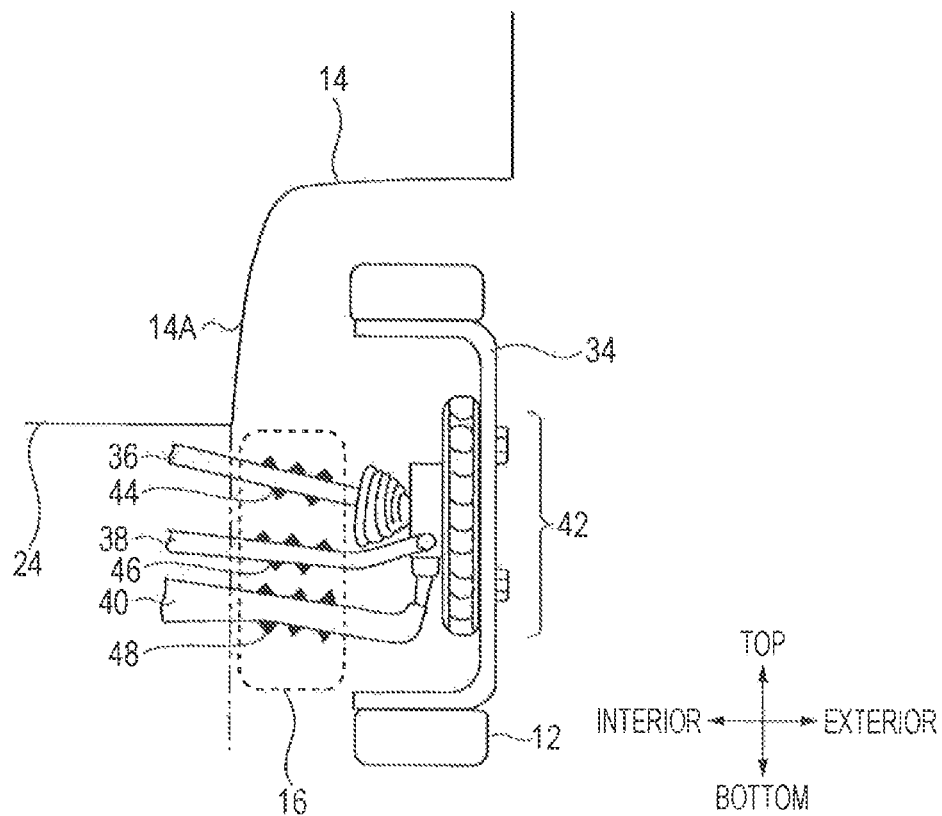
FIG. 4 is a diagram illustrating a vehicle aerodynamic structure according to another example of the present invention, which includes a cross-sectional view of a structure in which aerodynamic add-on devices are provided on the inboard side of a tire.

Another example according to the present invention will be described below with reference to FIG. 4. Although the vortex generator or other aerodynamic add-on device is disposed on an inner side wall of the mud guard 26 in the vehicle aerodynamic structure illustrated in FIGS. 2A, 2B, and FIG. 3, the aerodynamic add-on device may be provided in another location.

In other words, the aerodynamic on device may be provided on any of vehicle components disposed in the region 16, including, for instance, a drive shaft 36, a tie rod 38, and a lower arm 40. For the purpose of convenience, the region 16 is defined as a region surrounded by a plane (indicated by dashed-dotted lines) extending downward from the vertical wall 14A of the wheel house 14 and the inboard surface of the tire 12.

The drive shaft 36, the tie rod 38, and the lower arm 40 are connected to wheel 34 via a fastening portion 42. In other words, the aerodynamic add-on device according to may be provided on part of any of the drive shaft 36, the tie rod 38, and the lower arm 40 that is located within the region 16.

Aerodynamic add-on devices 44, 46, and 48 formed on the drive shaft 36, the tie rod 38, and the lower arm 40, respectively, are indicated by black triangles in the figure. The aerodynamic add-on device 44 and others may include the vortex generator 28 (see FIG. 2A) or may have the jet structure 32 (see FIG. 3) described above. The aerodynamic add-on device 44 and others formed on these components are able to accelerate and straighten an airflow passing through the region 16 when the vehicle is running.

Figure 5A:
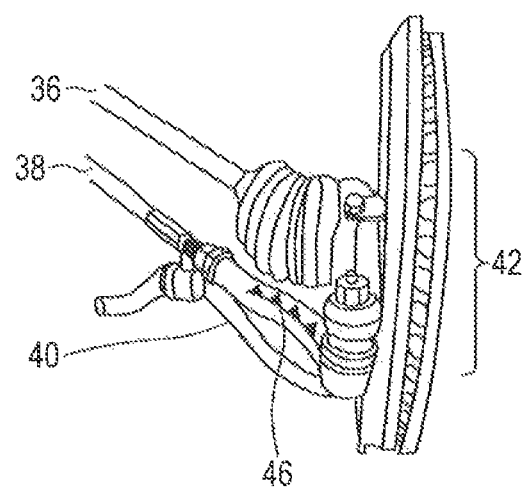
FIGS. 5A and 5B are diagrams illustrating a vehicle aerodynamic structure according to another example of the present invention, illustrating a tie rod provided with aerodynamic add-on devices.
Figure 5B:
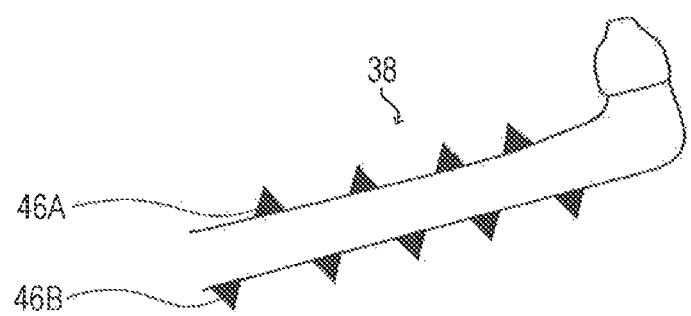

The tie rod 38 having the aerodynamic add-on devices 46 thereon will be described below with reference to FIGS. 5A and 5B. FIG. 5A is a perspective view illustrating a structure of the tie rod 38 and the like. FIG. 5B is a front view of the tie rod 38.

As illustrated in FIG. 5A, the tie rod 38 has the aerodynamic add-on devices 46 provided in the vicinity of its end connected to the fastening portion 42. Due to its location being in front of the drive shaft 36, the tie rod 38 more easily offers advantages of the aerodynamic add-on devices 46.

As illustrated in FIG. 5B, in this example, the tie rod 38 has aerodynamic add-on devices 46A provided on an upper surface thereof and also has aerodynamic add-on devices 46B provided on a lower surface thereof. The aerodynamic add-on devices 46A, 46B formed on both upper and lower surfaces of the tie rod 38 are able to accelerate an airflow just above and below the tie rod 38, thereby providing such benefits as reduced air resistance to a greater extent.

Furthermore, when the tie rod 38 is viewed from the front face, the aerodynamic add-on devices 46A provided on the upper surface of the tie rod 38 and the aerodynamic add-on devices 46B provided on the lower surface of the tie rod 38 need not be aligned with one another. In other words, the aerodynamic add-on devices 46A and the aerodynamic add-on devices 46B may be alternately arranged (or arranged in a zigzag alignment) in the direction in which the tie rod 38 extends. With this arrangement, air passing through the aerodynamic add-on devices 46A and 46B more easily generates a vortex and accelerates a larger amount of air, thereby offering the above-mentioned benefits to a greater extent.

Figure 6A:
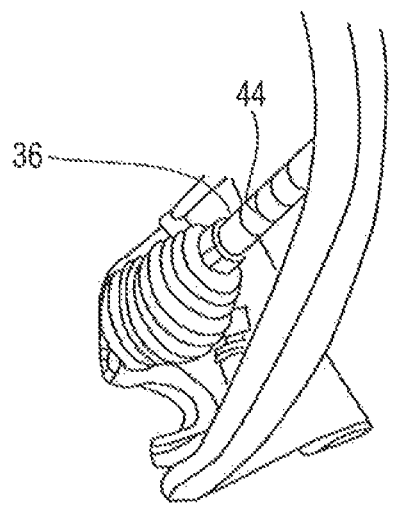
FIGS. 6A and 6B are diagrams illustrating a vehicle aerodynamic structure according to another example of the present invention, illustrating a drive shaft provided with aerodynamic add-on devices.
Figure 6B:
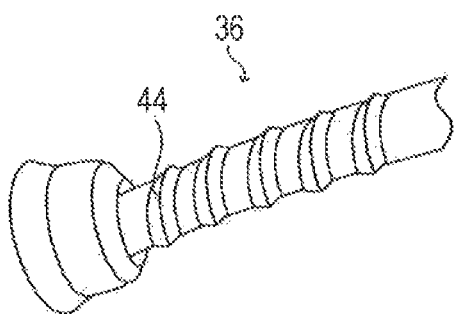

The drive shaft 36 having the aerodynamic add-on devices 46 thereon will he described below with reference to FIGS. 6A and 6B. FIG. 6A is a perspective view illustrating the structure of the drive shaft 36 and others. FIG. 6B is a diagram of the drive shaft 36 as viewed from the front.

As illustrated in FIG. 6A, the drive shaft 36 has the aerodynamic add-on device 44 formed in an area thereof close to the fastening portion 42 (see FIG. 5A) in this example.

As illustrated in FIG. 6B, the aerodynamic add-on device 44 is formed on the surface of the drive shaft 36 so as to be projected in a spiral fashion. The drive shaft 36 is rotated to transmit torque from a front differential gear to tires. As result, due to the spirally formed aerodynamic add-on devices 44, the aerodynamic add-on devices 44 disposed on both upper and lower sides of the drive shaft 36 are able to offer such benefits as accelerated airflow even if the drive shaft 36 is rotated. In addition, due to the spirally formed aerodynamic add-on devices 44, the aerodynamic add-on devices 44 disposed on the upper side of the drive shaft 36 and the aerodynamic add-on devices 44 disposed on the lower side of the drive shaft 36 are alternately arranged, thereby offering such benefits as accelerated airflow to a greater degree.

Figure 7A:
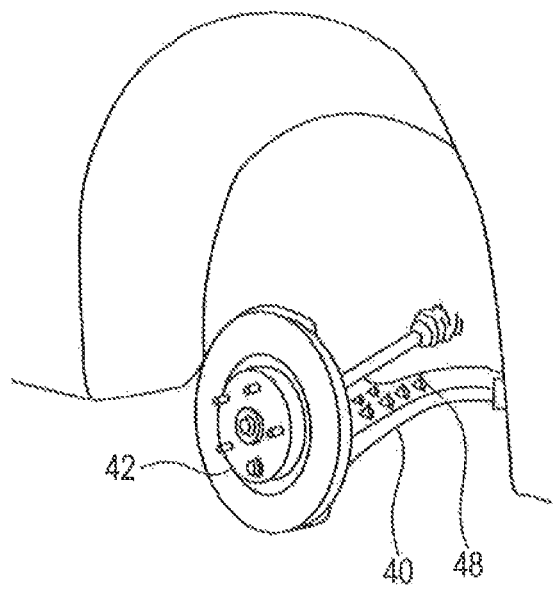
FIGS. 7A and 7B are diagrams illustrating a vehicle aerodynamic structure according to another example of the present invention, illustrating a lower arm provided with aerodynamic add-on devices.
Figure 7B:
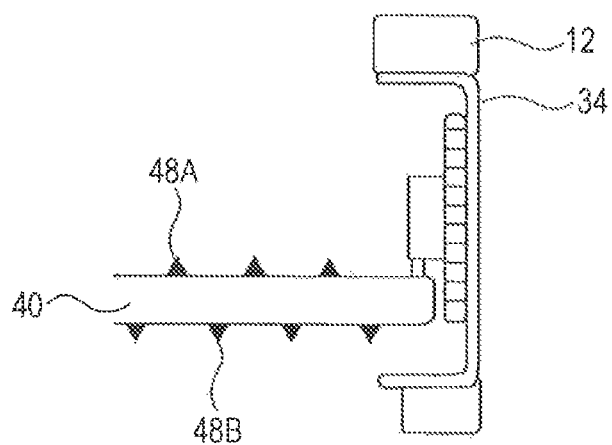
Figure 8:
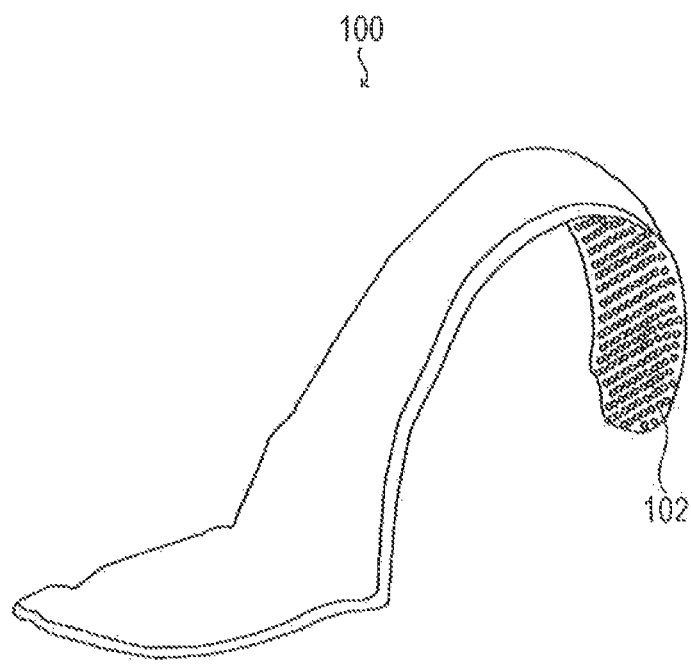
FIG. 8 is a diagram illustrating a related art, which includes a perspective view of a fender provided with aerodynamic add-on devices.
Figure 9:
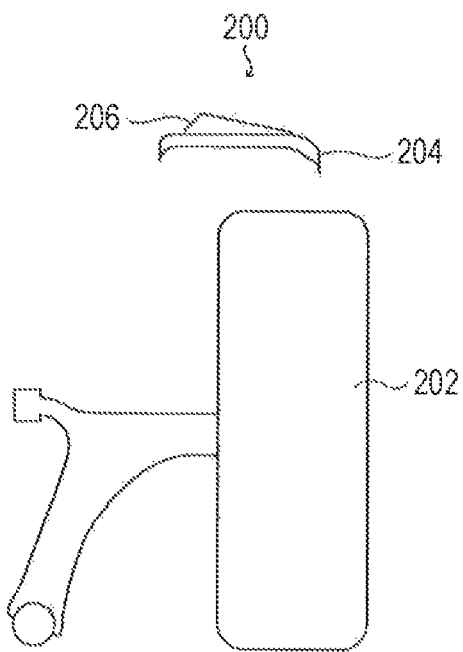
FIG. 9 is a cross-sectional view of a vehicle flow straightening device described in a related art.

The lower arm 40 having the aerodynamic add-on devices 48 thereon will be described below with reference to FIGS. 7A and 7B. FIG. 7A is a perspective view illustrating the lower arm 40. FIG. 7B is a view of the lower arm 40 as viewed from the front.

As illustrated in FIGS. 7A and 7B, the aerodynamic add-on devices 48 are formed in the vicinity of the fastening portion 42 on the upper and lower surfaces of the lower arm 40 in this example. The lower arm 40 is larger than other members in the longitudinal direction. This allows the aerodynamic add-on devices 48 to be disposed in a plurality in the crosswise and longitudinal directions. The plurality of the aerodynamic add-on devices 48 disposed on this upper and lower surfaces of the lower arm 40 maximize such benefits as accelerated airflow. As illustrated in FIG. 7B, the aerodynamic add-on devices 48A formed on the upper surface of the lower arm 40 and the aerodynamic add-on devices 48B formed on the lower surface of the lower arm 40 are alternately arranged in the or direction.

The present invention is typically described with reference to, but not limited to, the foregoing examples. Various modifications are conceivable within the scope of the present invention.

For instance, the aerodynamic add-on devices described above may be formed on a stabilizer, a housing, a suspension, and a sub-frame.

The aerodynamic add-on devices according to this example are illustrated in FIGS. 2A to 7B. The plurality of aerodynamic add-on devices may be combined.

The invention claimed is:

1. A vehicle aerodynamic structure that changes an airflow passing under a vehicle floor, the structure comprising:
   at least one aerodynamic add-on device that exerts an impact on the airflow passing under a lower surface of the vehicle floor,
   the device being disposed below the lower surface of the vehicle floor on the inboard side of an inboard surface of a tire so as to be located behind a front end of the tire or a flap,
   wherein the at least one aerodynamic add-on device is formed on a side wall of a mud guard extending below the lower surface of the vehicle floor, the side wall facing the tire.

2. The vehicle aerodynamic structure according to claim 1,
   wherein the at least one aerodynamic add-on device is a vortex generator.

3. The vehicle aerodynamic structure according to claim 1,
   wherein the at least one aerodynamic add-on device has a jet structure.

4. The vehicle aerodynamic structure according to claim 1, wherein the side wall of the mud guard comprises a hanging portion that extends downward from a vertical wall section of the mud-guard below the lower surface of the vehicle floor, and the hanging portion has a surface extending in a forward to rearward direction as to present an exposed surface that opposes an interior side surface of the tire, and on the hanging portion is provided the at least one aerodynamic add-on device.

5. The vehicle aerodynamic structure according to claim 4 wherein there are a plurality of aerodynamic add-on devices that are positioned between the exposed surface of the hanging portion and the interior side surface of the tire as to be farther extended into an air flow region, formed between the hanging portion and the interior side of the tire, than the exposed surface of the hanging portion.

6. The vehicle aerodynamic structure according to claim 5 wherein there is a plurality of aerodynamic add-on devices spaced apart on the hanging portion.

7. The vehicle aerodynamic structure according to claim 6 wherein the plurality of aerodynamic add-on devices includes individual vortex generators.

8. The vehicle aerodynamic structure according to claim 7 wherein the individual vortex generators are projections that each include a section that reduces in vertical thickness in a direction of airflow travel along the hanging portion.

9. The vehicle aerodynamic structure according to claim 8 wherein the projections are diamond shaped.

10. The vehicle aerodynamic structure according to claim 1 wherein there is a plurality of aerodynamic add-on devices spaced apart on the side wall of the mud guard.

11. The vehicle aerodynamic structure according to claim 1 wherein the at least one aerodynamic add-on device formed on a side wall of the mud guard comprises a jet structure having an upstream, relative to air flow, inlet that is larger in area than a downstream exit region for received airflow in the jet structure.

12. The vehicle aerodynamic structure according to claim 1 wherein the at least one aerodynamic add-on device extends only in a region, relative to a direction of airflow travelling between an interior surface of the tire and the side wall facing the tire, that is between the front and rear ends of the tire.

13. The vehicle aerodynamic structure according to claim 1 wherein there is a plurality of aerodynamic add-on devices that project into an air flow stream travelling in a vehicle front to rear direction, and which plurality of aerodynamic add-on devices are disposed between the side wall of the mud guard and an interior side of the tire as to accelerate the air flow stream in the vehicle front to rear direction.

14. The vehicle aerodynamic structure according to claim 1 wherein the side wall of the mud guard that extends below the lower surface of the vehicle floor extends in an airflow passage direction as to face and oppose an interior side wall of the tire.

15. The vehicle aerodynamic structure according to claim 1 wherein the mud guard is disposed inside a wheel house of the vehicle so as to surround an upper part of the tire.

16. The vehicle aerodynamic structure according to claim 1 wherein the mud guard side wall is comprised of a vertical wall section and a hanging portion extending down from the vertical wall below the vehicle floor, and on which hanging portion the at least one aerodynamic add-on device is disposed.

17. The vehicle aerodynamic structure according to claim 16 wherein the hanging portion has a shorter longitudinal distance in a front to rear direction of the vehicle than the vertical wall.

18. The vehicle aerodynamic structure according to claim 17 wherein the vertical wall has a shorter longitudinal distance in the front to rear direction of the vehicle than a portion of the mud guard that surrounds an upper part of the tire.

19. The vehicle aerodynamic structure according to claim 16 wherein the hanging portion has a longitudinal extension in a front to rear direction of the vehicle that is entirely rearward of the front of the tire and entirely forward of the rear of the tire.

20. The vehicle aerodynamic structure according to claim 19 wherein the vertical wall section has a longitudinal extension that extends forward of the front of the tire.

* * * * *